Patented Apr. 20, 1948

2,439,833

UNITED STATES PATENT OFFICE 2,439,833

PROCESS FOR PLUGGING WELLS

Cary R. Wagner, Utica, Ohio, assignor to Phillips Petroleum Company, a corporation of Delaware No Drawing. Application July 3, 1945, Serial No. 603,107

2 Claims. (Cl. 166—22)

This invention relates to processes for plugging well formations. In one specific aspect it relates to a process for plugging a formation with two separately injected liquids which react to form a water insoluble film of solid matter. In another specific aspect it relates to such a process in which one of the liquids is already present in the formation as a connate or natural percolating liquid. In another aspect it relates to re-dissolving the plugging matter. In a more specific aspect it relates to such processes employing aqueous solutions of a water soluble cellulose known as sodium carboxymethylcellulose as one of the reacting substances and solutions of salts or solid salts either natural in occurrence in the formation or injected thereinto to form the second of said reacting substances. In another specific aspect it relates to the use of alkali such as sodium hydroxide as the re-dissolving agent.

In the art of wells it is often desirable to seal the passages in a natural formation so that fluids will not pass therethrough. For example a selective sealing off of the water bearing portion of a formation while allowing the oil bearing formations to remain unsealed is often most desirable. In some cases the water bearing formation is permeable enough to allow such selective sealing off. Sodium carboxymethylcellulose solutions are not oil miscible. The exclusion of water from oil bearing formations is best accomplished by retention of said water in its original water bearing formation. It is often desirable to re-dissolve a plugging agent, which has been impossible in the prior art in most cases.

The primary object of this invention is to provide a process whereby formations may be plugged.

One object is to provide a two fluid plugging process.

Another object is to provide a process using a single fluid reacting to plug the formation with fluids in place.

Still another object is to seal off water bearing formations.

Another object is to provide a plugging process in which well formations are plugged by a plugging material and later unplugged by the removal of the plugging material by a suitable dissolving agent.

Numerous other objects and advantages will be apparent to those skilled in the art upon reading the accompanying specification and claims.

This invention may be regarded as a continuation-in-part of my application Serial No. 549,299, filed August 12, 1944 (now Patent No. 2,425,768), for Drilling fluids and methods of use. In that application, on page 3, lines 17 to 28, the reaction taking place between water solutions of sodium carboxymethylcellulose and calcium ions from calcium chloride or the like in connate waters was discussed. The colloidal haze formed is suitable to plug some fine grained formations. Other salts occurring in connate waters have a more definite plugging and/or precipitating effect.

Connate waters containing iron salts, such as ferrous sulphate or ferric chloride, for example, act strongly to precipitate and plug formations into which water solutions of sodium carboxymethylcellulose are injected.

I have found that ferrous sulphate, ferric chloride, barium nitrate, stannous chloride, basic lead acetate and aluminum sulphate solutions are useful in causing precipitation and plugging of natural formations in wells. The barium nitrate precipitates exhibit some thixotrophic gel qualities but are still useful as a plugging agent. I have also found that all of these plugging materials except the basic lead acetate precipitate, are removable to a large extent by washing the formation with a solution of five percent sodium hydroxide. Other suitable dissolving agents are potassium, lithium, cesium, rubidium and ammonium hydroxide but I prefer sodium hydroxide. The five percent solution is merely preferred and is not critical as more or less concentrated solutions may be employed with resulting differences in time of dissolution.

OPERATION

The method of operation is as follows:

The single liquid process

A suitable quantity of sodium carboxymethylcellulose solution is prepared. The amount is calculated by the linear extent of the formation to be plugged and the radial depth to which it is to be plugged. The amount of sodium carboxymethylcellulose can range from about four pounds to the barrel of water, to as thick a mixture as can be pumped in place, depending on the density of the plugging desired. Smaller amounts can be used with less effect. This solution is pumped down into the well in the usual manner of plugging fluids and may be guided into place by packers or such methods of specific gravity difference and other methods old in the prior art. The natural salts or connate water salts in the formation or in percolating waters then act to precipitate the sodium carboxymethylcellulose in place over a suitable period of time.

In many instances however there will not be sufficient natural salts present to have a suitable effect and the two liquid process must be employed.

The two liquid process

In this process a second liquid is employed. The second liquid consists of a solution of a suitable amount of ferrous sulphate, ferric chloride, barium nitrate, stannous chloride, basic lead acetate or aluminum sulphate, which amount is that calculated to react with the amount of sodium carboxymethylcellulose in the first liquid described above under the "single liquid process."

Either the first or second liquid is injected first into the formation in the well followed by the other, or they may be injected in alternate slugs and in some cases these slugs may be separated by an inert material such as water. In some instances they may be mixed and rapidly injected together but this is not preferred.

The water used in making the first and second liquids need not be particularly pure and may contain clays and other impurities to a greater or less extent depending on the density required in the plugging material, the more density required the purer the reagents employed should be.

While specific details of the preferred mode of operations has been given for purposes of illustration it is to be understood that the invention is not to be limited thereby but is limited solely by the language of the appended claims.

Having described my invention, I claim:

1. The process of plugging a porous formation in a well comprising the steps of introducing into the formation a sufficient amount of an aqueous solution of sodium carboxymethylcellulose and a sufficient amount of an aqueous solution of a salt selected from the group consisting of ferrous sulphate, ferric chloride, barium nitrate, stannous chloride, basic lead acetate and aluminum sulphate, to react and form a water insoluble precipitate in an amount sufficient to effectively plug said porous formation.

2. The process of temporarily plugging a porous formation in a well comprising the steps of introducing into the formation a sufficient amount of an aqueous solution of sodium carboxymethylcellulose and a sufficient amount of an aqueous solution of a salt selected from the group consisting of ferrous sulphate, ferric chloride, barium nitrate, stannous chloride, and aluminum sulphate, to react and form a water insoluble precipitate in an amount sufficient to effectively plug said porous formation, and then unplugging said plugged formation by washing with a sufficient amount of an aqueous solution of a hydroxide selected from the group consisting of sodium, potassium, lithium, and ammonium hydroxides, to remove sufficient of said precipitate to make said formation porous again.

CARY R. WAGNER.

REFERENCES CITED

The following references are of record in the file of this patent:

UNITED STATES PATENTS

| Number | Name | Date |
|---|---|---|
| 2,174,027 | Ball | Sept. 26, 1939 |
| 2,294,078 | Dow et al. | Aug. 25, 1942 |
| 2,331,858 | Freeman et al. | Oct. 12, 1943 |
| 2,331,859 | Roberts | Oct. 12, 1943 |
| 2,336,636 | Peterson | Dec. 14, 1943 |
| 2,343,136 | Dobson et al. | Feb. 29, 1944 |